(12) United States Patent
Chiou

(10) Patent No.: US 7,219,993 B1
(45) Date of Patent: May 22, 2007

(54) EYEGLASSES WITH LENSES CHANGEABLE

(76) Inventor: Ching-Hae Chiou, P.O. Box 90, Tainan City 70499 (TW)

( * ) Notice: Subject to any disclaimer, the term of this patent is extended or adjusted under 35 U.S.C. 154(b) by 0 days.

(21) Appl. No.: 11/286,322

(22) Filed: Nov. 25, 2005

(51) Int. Cl.
*G02C 1/04* (2006.01)

(52) U.S. Cl. ........................ 351/103; 351/106
(58) Field of Classification Search .............. 351/41, 351/44, 103–109, 154
See application file for complete search history.

(56) References Cited

U.S. PATENT DOCUMENTS 5,467,148 A * 11/1995 Conway ................. 351/85

* cited by examiner

Primary Examiner—Huy Mai

(57) ABSTRACT

Eyeglasses with lenses changeable include an elongate frame, a nose pad supporter, a lens set and two nose pads. The frame is provided with a lengthwise fitting groove for an upper lengthwise side edge of the lens set to fit therein so that the lens set may be combined removably with the frame. Then different lens sets may be assembled with or disassembled from the frame for changing lens sets if wanted. The assembling or disassembling of the lens set with the frame is effected by engagement of a protrusion formed on an engage block and an engage hole with a notch formed in the lens set. The engage block is formed integral with the nose pad supporter, which is formed integral with the frame. So the lens set is easily assembled with or disassembled from the frame.

4 Claims, 7 Drawing Sheets

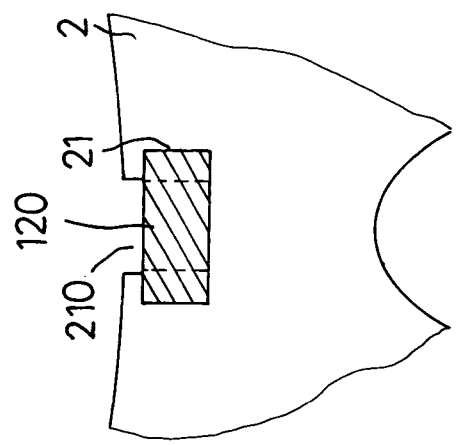
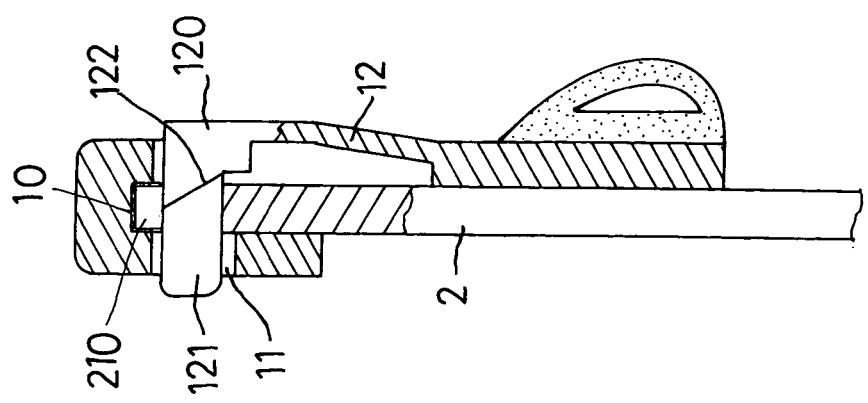

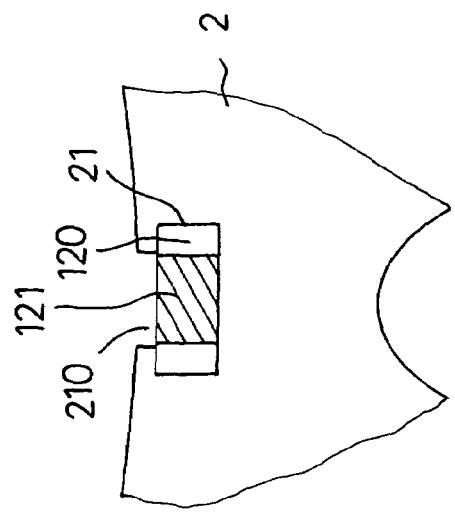
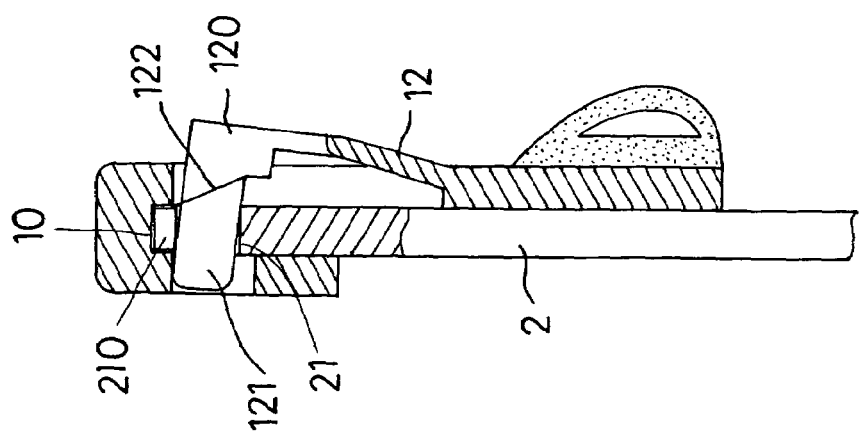

EYEGLASSES WITH LENSES CHANGEABLE

BACKGROUND OF THE INVENTION

1. Field of the Invention

This invention relates to a pair of eyeglasses with lenses changeable, particularly to one provided with an elongate frame, and a lens set easily removably combined with the frame for changing the lens set in case of need. A nose pad supporter is formed integral with an inner side of an intermediate portion of the frame, and an elastic engage block is formed in an upper side of the nose pad supporter, with a protrusion provided in the front of the engage block, and an inclined surface formed respectively at two sides of an inner end of the protrusion. The lens set is provided with two lenses, a protrusion hole formed in an upper side of a center portion and between the two lenses, and a notch formed on the protrusion hole and communicating with the protrusion hole. In combining the lens set with the frame, the notch of the lens set is moved along on the inclined surfaces of the nose pad supporter and push on the engage block, letting the protrusion fit and move in the notch, and then the nose pad supporter is pushed forward to let the engage block insert in the engage hole of the lens set to stabilize the lens set in place combined with the frame. On the contrary, in disassembling, the protrusion of the nose pad supporter is pressed to let the engage block released from the engage hole of the lens set, and then the lens set is taken off the frame.

2. Description of the Prior Art

Conventional eyeglasses generally have a frame, and the frame has its two ends respectively provided with an opening, and a fixing base formed respectively at two sides of the opening, with the fixing bases locked with screws so as to stabilize two lenses in the frame rims. If lenses are to be affixed or replaced in the frame, a screw driver is used to loosen the screws so that the lenses may be fitted in or taken off, needing some time and work, and the work has to be done skillful technician. Otherwise common people cannot do it for themselves. Provided the screws should fall off, the lenses may also fall off the frame rims, possible to be broken. Another kind of eyeglasses is made of plastic, so the lenses may not be combined with the frame unless the frame and the lenses are warmed, not easily replacing the lenses with other ones, even if they are wanted to be replaced with other colored ones.

SUMMARY OF THE INVENTION

This invention has been devised to offer eyeglasses with lenses changeable so as to use proper lenses if needed.

The feature of the invention is an elongate frame provided with a lengthwise fitting groove for an upper lengthwise edge of a lens set to fit therein and a protrusion provided on an engage block formed integral with a nose pas supporter, which is provided integral with the frame, and a fitting hole with a notch formed in the lens set. Then the lens set is assembled with the frame or disassembled from the frame easily by engaging or disengaging the protrusion of the engage block with or from the fitting hole of the lens set via the notch.

BRIEF DESCRIPTION OF DRAWINGS

This invention will be better understood by referring to the accompanying drawings, wherein:

FIG. 5 is another cross-sectional view of the eyeglasses in the present invention;

FIG. 6 is a front view of FIG. 5;

FIG. 9 is a third relative view of assembling process of the lens set with the frame in the present invention; and, FIG. 10 is a front view of FIG. 9.

DETAILED DESCRIPTION OF THE PREFERRED EMBODIMENT

Figure 1:
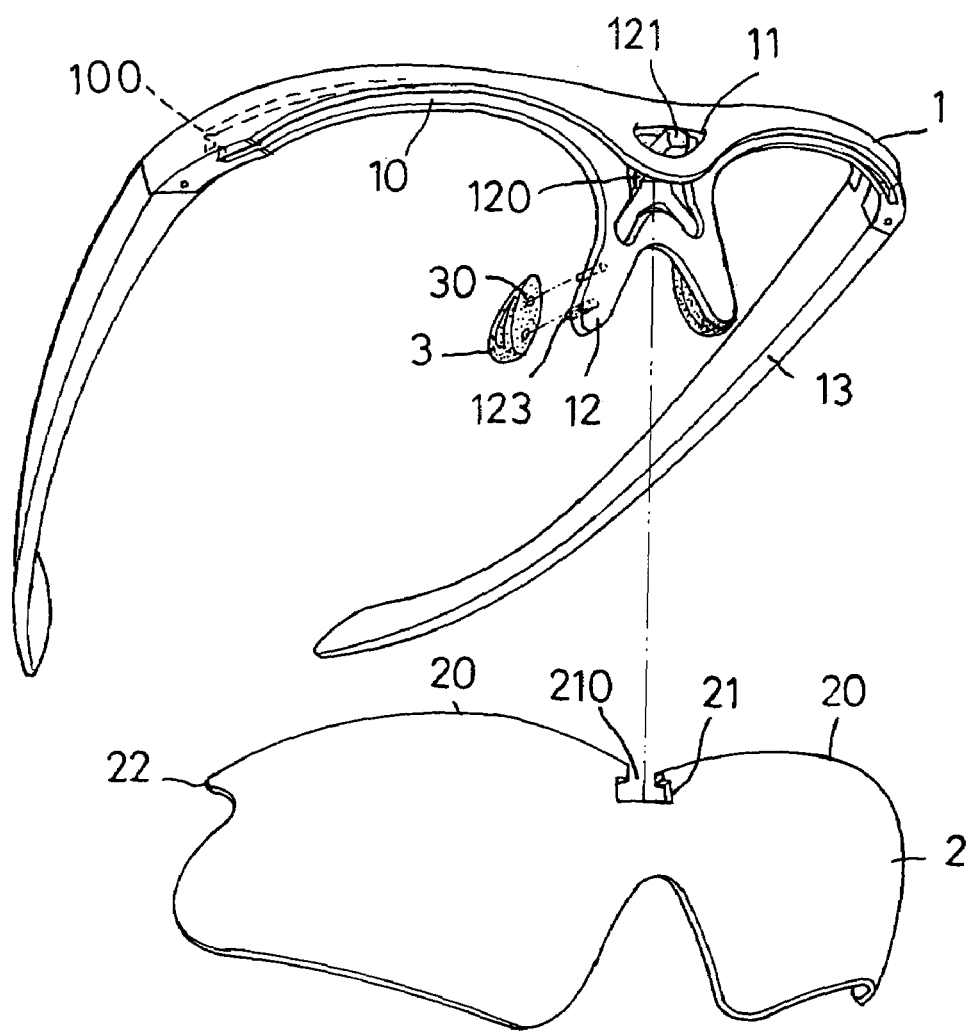
FIG. 1 is an exploded perspective view of a pair of eyeglasses with lenses changeable in the present invention.
Figure 2:
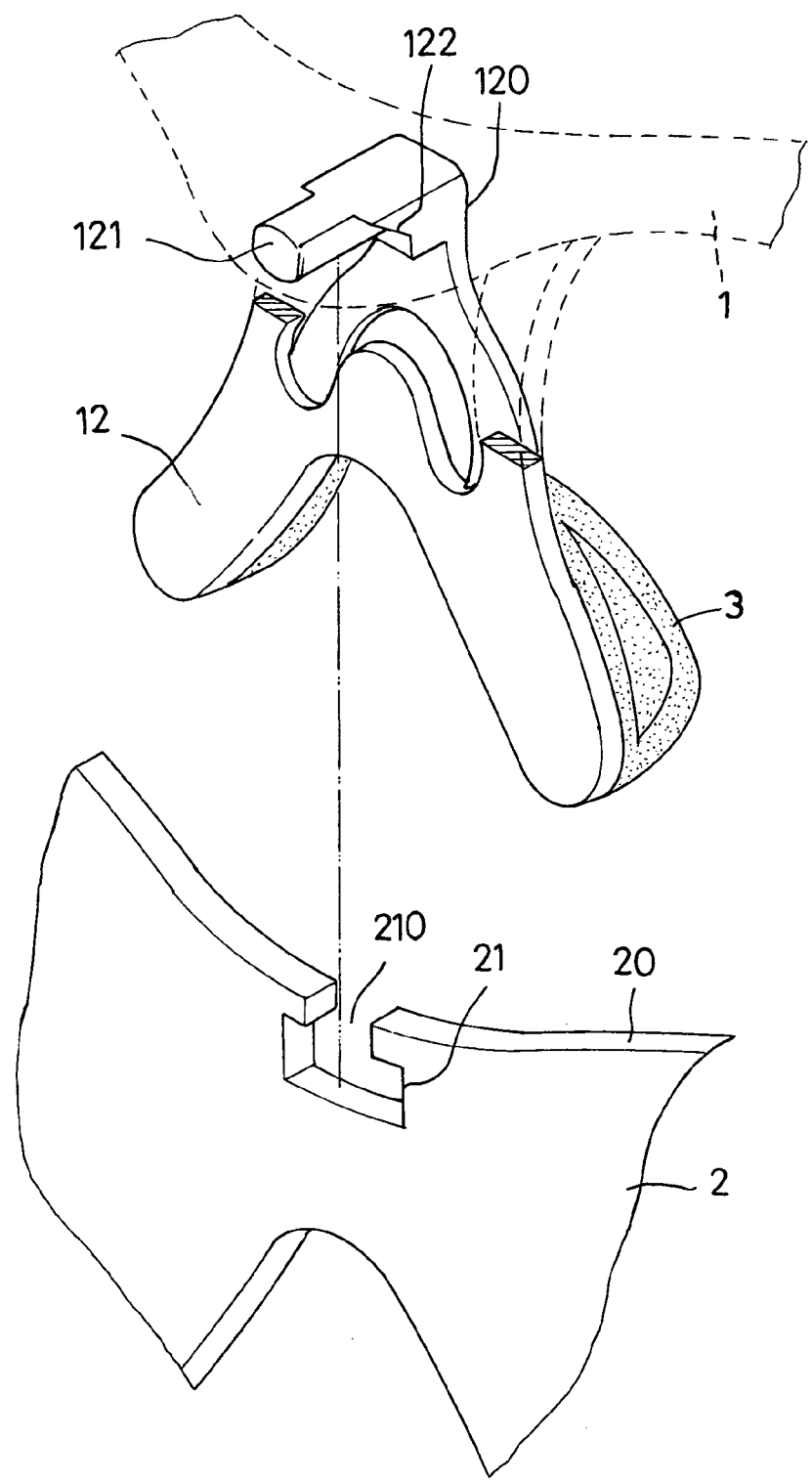
FIG. 2 is a partial perspective view of a nose pad supporter and a lens set in the eyeglasses in the present invention.
Figure 3:
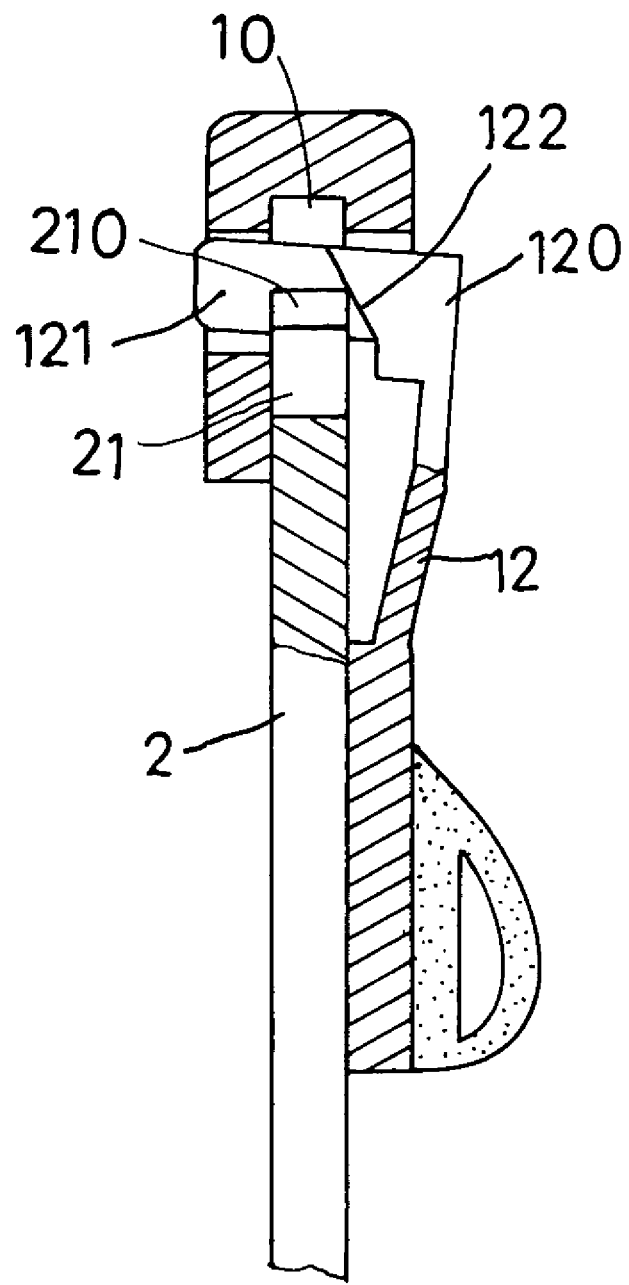
FIG. 3 is a cross-sectional view of the eyeglasses with lenses changeable in the present invention.
Figure 4:
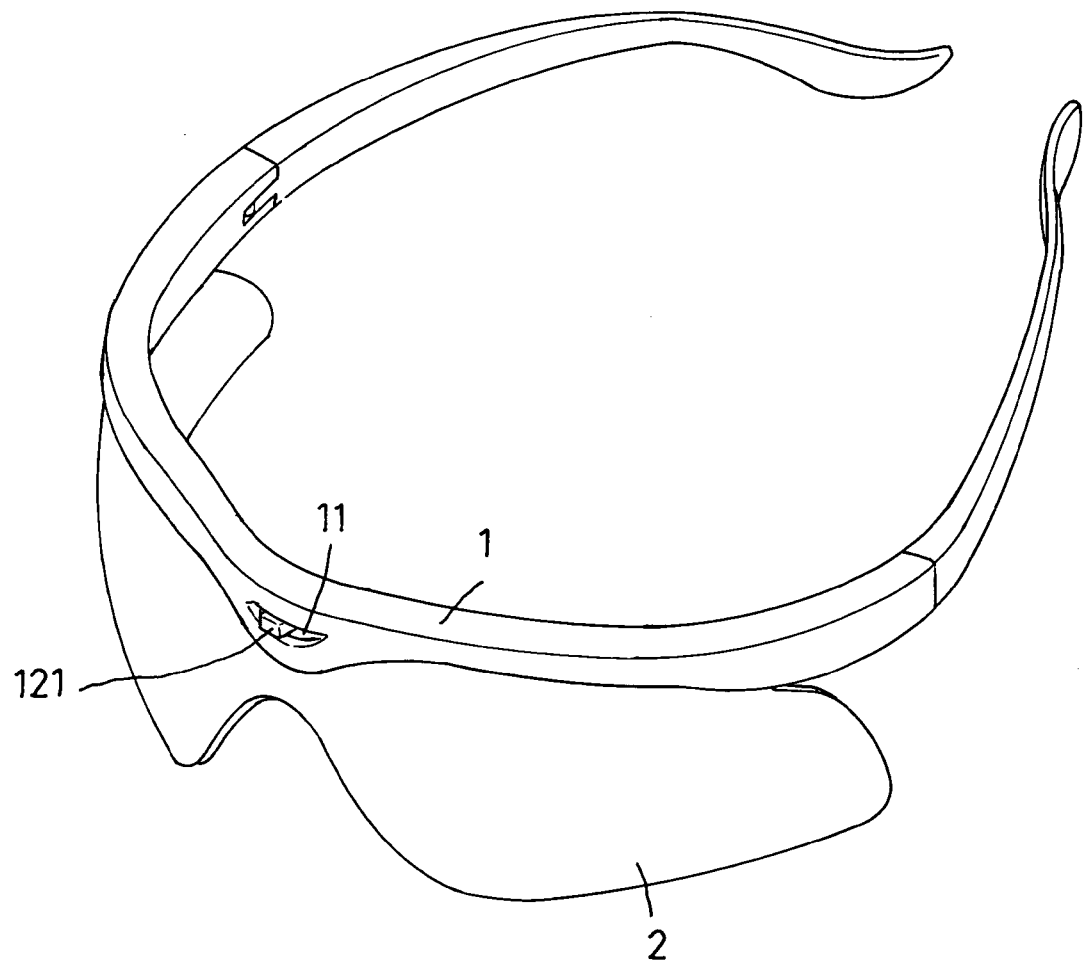
FIG. 4 is a perspective view of the eyeglasses with lenses changeable in the present invention.
Figure 7:
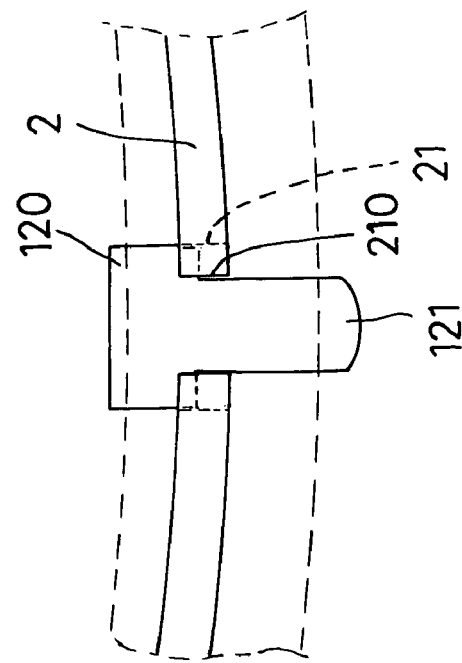
FIG. 7 is a first relative view of assembling process of the lens set with the frame in the present invention.
Figure 8:
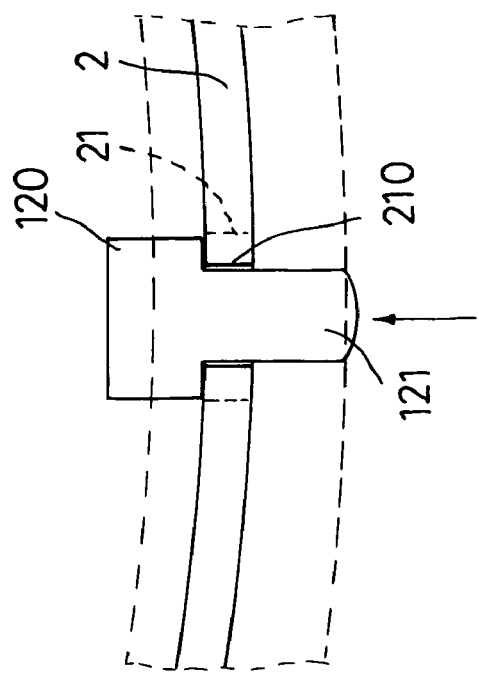
FIG. 8 is a second relative view of assembling process of the lens set with the frame in the present invention.

A preferred embodiment of a pair of eyeglasses with lenses changeable in the present invention, as shown in FIGS. 1 and 2, includes an elongate frame 1, a lens set 2 and two nose pads 3.

The elongate frame 1 is provided with a fitting groove 10 formed lengthwise in a lower side, an insert groove 100 formed respectively at two ends of the fitting groove 10, a center hole 11 formed in an outer side of a center section of a wall defining the fitting groove 10, a nose pad supporter 12 formed as a fork-shape and integral with the frame 1, an elastic engage block 120 added on an upper side of the nose pad supporter 12 and swingable a little back and forth, a protrusion 121 formed to extend forward sidewise from an upper end of the engage block 120 and to insert in the center hole 11 of the frame 10. Further, an inclined surface 122 is provided respectively at two sides of the inner end of the protrusion 121 and the nose pad supporter 12 has two protrusions 123 extending sidewise. Two temples 13 are combined with two ends of the frame 10.

The lens set 2 has an upper lengthwise side edge 20 to fit in the fitting groove of the frame 10 for combination, an engage hole 21 in a center section of the upper portion of the lens set 20 to correspond to the engage block 120 of the nose pad supporter 12, and a notch 210 formed on the engage hole 21 and communicating with the engage hole 21, and a fitting pointed member 22 formed respectively at two ends for fitting with the insert grooves 100 of the frame 10.

The two nose pads 3 are affixed with the nose pad supporter 12, having two insert holes 30 for the protrusions 123 to insert therein for combining the nose pads 3 with the nose pad supporter 12.

In assembling, referring to FIGS. 1–4, firstly, the lens set 2 is made to let the two fitting pointed members 22 fitted in the insert grooves 100 of the frame 10, and the upper side edge 20 of the lens set 2 is aligned to the fitting groove 10 of the frame 10, so that the lens set 2 may be pushed up, letting the notch 210 of the lens set 2 slide along the inclined surfaces 122 of the nose pad supporter 12 and pushing the engage block 120 back so that the upper side edge 20 of the lens set 2 fitting in the fitting groove 10, with the protrusion 121 entering the notch 210 and the engage block 120 fitting in the engage hole 21 by moving forward the nose pad supporter 12. Then the lens set 2 is completed combining with the frame 1.

In disassembling the lens set 2 from the frame 1, as shown in FIGS. 5–10, only the protrusion 121 inserted in the hole 11 of the frame 1 is needed to be pressed inward until the engage block 120 retreats out of the engage hole 21, permitting the lens set 2 separate from the nose pad supporter 12 of the frame 1, finishing disassembling.

While the preferred embodiment of the invention has been described above, it will be recognized and understood that various modifications may be made therein and the appended claims are intended to cover all such modifications that may fall within the spirit and scope of the invention.

What is claimed is:

1. Eyeglasses with lenses changeable comprising:

a frame 1 being elongate and provided with a fitting groove formed in an inner lower lengthwise side and a center hole in a center section of an outer side, a nose pad supporter formed integrally with an inner side of said frame, said nose pad supporter affixed with an elastic engage block on an upper side, said nose pad supporter having a bi-forked structure at a lower side thereof for attaching nose pads; said elastic engage block having a reverse Y shape with a bi-forked structure at a lower side; and an upper side of said elastic engage block having a protrusion formed in a front portion; said elastic engage block being separated from the protrusion, said protrusion extending in said center hole of said frame and provided with an inclined surface respectively at two sides of its inner end; and, a lens set having an upper lengthwise side fitting in said fitting groove of said frame so that said lens set may be combined with said frame, the lens set having a right lens and a left lens which are connected as an integral body, in assembly, the right lens and the left lens being arranged at two sides of the center hole; said lens set provided with an engage hole in a central upper section, this is, between the left lens and right lens; and the lens set having a notch on said engage hole and communicating with said engage hole so that in assembly, the protrusion inserts through the engage hole of the lens set.

2. The eyeglasses with lenses changeable as claimed in claim 1, wherein said fitting groove of said frame has two ends respectively provided with an insert groove.

3. The eyeglasses with lenses changeable as claimed in claim 1, wherein said lens set is provided with an insert pointed member respectively at two ends of an upper lengthwise edge.

4. The eyeglasses with lenses changeable as claimed in claim 1, wherein said nose pad supporter is affixed with two nose pads.

* * * * *